United States Patent [19]

Casey et al.

[11] Patent Number: 5,304,517
[45] Date of Patent: Apr. 19, 1994

[54] TOUGHENED GLASS CERAMIC SUBSTRATES FOR SEMICONDUCTOR DEVICES SUBJECTED TO OXIDIZING ATMOSPHERES DURING SINTERING

[75] Inventors: Jon A. Casey; Sylvia M. DeCarr, both of Poughkeepsie; Srinivasa S. N. Reddy, LaGrangeville; Subhash L. Shinde, Croton-on-Hudson; Vivek M. Sura; Rao R. Tummala, both of Hopewell Junction, all of N.Y.

[73] Assignee: International Business Machines Corporation, Armonk, N.Y.

[21] Appl. No.: 11,577

[22] Filed: Feb. 1, 1993

[51] Int. Cl.$^5$ .............. C03C 14/00; C03C 8/18
[52] U.S. Cl. ..................... 501/32; 501/19; 501/9; 264/65; 419/19
[58] Field of Search .............. 501/36, 19, 9; 264/65; 419/19

[56] References Cited

U.S. PATENT DOCUMENTS 4,474,731  10/1984  Brownlow et al. ............... 419/5
4,748,136  5/1988   Mahulikar et al. ............... 501/32

FOREIGN PATENT DOCUMENTS 791064  7/1968  Canada ............... 501/32

OTHER PUBLICATIONS

Journal of Materials Science, vol. 25 (1990), pp. 3291-3296, Vaidya, et al., "Metallic Glass Ribbon-Reinforced Glass-Ceramic Matrix Composites".
Journal of Materials Science, vol. 26 (1991), pp. 1391-1394, Vaidya, et al., "Elevated Temperature Mechanical Properties of Continuous Metallic Glass Ribbon-Reinforced Glass-Ceramic Matrix Composites".

Primary Examiner—Mark L. Bell
Assistant Examiner—C. M. Bonner
Attorney, Agent, or Firm—Ira David Blecker

[57] ABSTRACT

A sintering process is described using a glass-ceramic slurry containing an alloy powder or flakes selected from a group of alloys consisting of:

| | |
|---|---|
| Fe—Cr | Cu—Ti |
| Fe—Cr—Ni | Ag—Ti |
| Cr—Al | Nb—Al |
| Ni—Cr | Cu—Al |
| Ni—Al | Cu—Al—Cr |
| Fe—Al | |

The slurry is molded and later is sintered in a steam atmosphere at a temperature of about 1000° C. to yield a glass-ceramic substrate toughened against crack propagation and useful in the packaging of semi-conductor device chips.

7 Claims, 1 Drawing Sheet

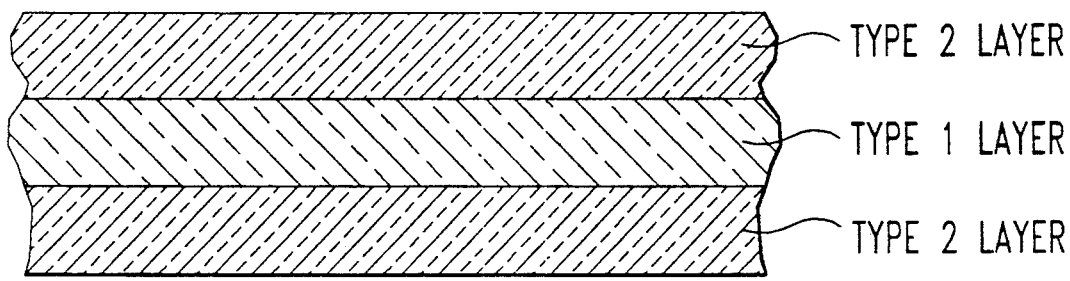

TOUGHENED GLASS CERAMIC SUBSTRATES FOR SEMICONDUCTOR DEVICES SUBJECTED TO OXIDIZING ATMOSPHERES DURING SINTERING

BACKGROUND OF THE INVENTION

The invention generally relates to the fabrication of glass ceramic substrates for the packaging of semiconductor device chips and, more particularly, to the toughening of the brittle glass-ceramic substrates in a manner compatible with existing substrate processing cycles including high temperature sintering in the presence of oxygenating ambients.

As is well understood, the toughness of a ceramic is a material property which is a measure of the resistance against crack propagation when the ceramic is stressed. Glass ceramics, particularly based on cordierite, are not as tough as other structural ceramics such as alumina, silicon nitride, silicon carbide, zirconia, etc. It is desirable to enhance glass-ceramic toughness for certain applications and techniques have been proposed to achieve that end. It is known, for example, that fibers of metallic glass ribbon reinforcement of glass ceramic matrix provide improvement in the fracture toughness of the glass-ceramic matrices formed by heat treatment of the composites. This is described in papers by R. U. Vaidya and K. N. Subramanian, "Reinforced Glass-Ceramic Matrix Composites", *Journal of Materials Science*, 25 (1990), pp. 3291–3296 and "Elevated Temperature Mechanical Properties of Continuous Metallic Glass Ribbon-Reinforced Glass-Ceramic Matrix Composites", *Journal of Materials Science*, 26 (1991) pp. 1391–1394. The described toughening techniques reportedly include laying out the metallic glass ribbons within glass powders in a steel die, pressing the composite specimens at 3000 p.s.i., heating to 200° C. to drive out organic binder and then sintering and devitrifying at 400° C. and 450° C., respectively. The problem of the toughening of glass ceramic substrates subjected to more rigorous high temperature (up to 1000° C.) sintering in steam was not addressed.

Brownlow, et al., U.S. Pat. No. 4,474,731, discloses the steam sintering of ceramic materials containing conductive pathways suitable for the packaging of semiconductor device chips. This patent teaches a steam sintering cycle for glass-ceramic in which nickel or palladium is added to the glass-ceramic green sheets as catalysts for carbon removal by oxidation. NiO and Pd (NO$_3$)$_2$ were used as the catalytic agents. Material properties of the sintered ceramic, such as toughness and strength are not discussed.

BRIEF SUMMARY OF THE INVENTION

One object of the present invention is to provide a toughened glass ceramic and glass plus ceramic substrates utilizing a slurry compatible with state-of-the-art semiconductor chip device packaging processes.

Another object is to provide such substrate utilizing a high temperature oxygenating sintering cycle.

A further object is to provide such a substrate utilizing high temperature sintering in the presence of a steam ambient.

These and other objects of the present invention are achieved by the introduction of a metal alloy selected from a specified group of powders or flakes into a glass-ceramic powder slurry. The resulting composite is cast into greensheet and sintered later in a steam sintering cycle. The volume percent of the selected metal alloy preferably is in the range of 2–20 volume percentage of the fired glass-ceramic so that the electrical insulating characteristics of the toughened glass ceramic are not adversely impacted. The above-mentioned group consists of the following alloy systems:

| | |
|---|---|
| Fe—Cr | Cu—Ti |
| Fe—Cr—Ni | Ag—Ti |
| Cr—Al | Nb—Al |
| Ni—Cr | Cu—Al |
| Ni—Al | Cu—Al—Cr |
| Fe—Al | |

The specified group of metal alloys is stable in steam sintering cycles so that a thin oxide coating forms on the alloy surface during steam oxidation. It is important to retain the ductility of alloy particles and not completely oxidize it during sintering. Good adhesion should be achieved between the selected metal alloy and the glass-ceramic body because of the oxide scale. The toughened glass-ceramic may be used as a covering layer only or as the entire ceramic substrate.

BRIEF DESCRIPTION OF THE DRAWINGS

The sole FIGURE is a cross-sectional view of a covering layer embodiment of the present invention.

BEST MODE FOR CARRYING OUT THE INVENTION

In accordance with the present invention, the binders, solvents, glass ceramic powder and toughening powders or flakes are mixed by milling to form a slurry. The slurry is spread on Mylar with a blade to form a thin sheet when dry. The ceramic greensheet is separated from the Mylar and then hot laminated with a desired number of other similar sheets. It is to be understood that the greensheets, prior to lamination, also are provided with metal powder paste patterns to form desired conductive pathways and "through-holes" as is the conventional practice. Firing of the laminated sheets is accomplished in a steam ambient up to about 800° C. to remove organic and carbonaceous reside and then to about 1000° C. in an inert or reducing atmosphere to complete densification. The toughening powders or flakes are restricted by a volume percent below about 20% of the sintered volume and are selected from the following alloy systems:

| | |
|---|---|
| Fe—Cr | Cu—Ti |
| Fe—Cr—Ni | Ag—Ti |
| Cr—Al | Nb—Al |
| Ni—Cr | Cu—Al |
| Ni—Al | Cu—Al—Cr |
| Fe—Al | |

The volume percentage limitation is necessary so that the electrical insulating characteristics of the fixed glass-ceramic substrate are not compromised by excess metallic alloy toughening agent present.

A number of alloy systems, selected from the above-defined group, have been employed with the results set forth in the following table. In particular, Ni-Cr (15μ average particle size), Cu-Al (8–15μ average particle size) and Cu-Al-Cr (6μ average particle size) were selected and added to the glass-ceramic at 5–10 volume percent as indicated.

Two types of glass-ceramic compositions, namely type 1 and type 2 were considered having thermal expansion coefficients of 3ppm/° C. and 2ppm/° C. respectively. The general composition of these cordierite type ceramics are disclosed in U.S. Pat. No. 4,301,324, issued to Ananda H. Kumar, et al., on Nov. 17, 1981. The following specimens were sintered in a steam cycle similar to that described by the cited Brownlow, et al., patent.:

Glass-ceramic specimens of type 1 and 2 without alloy additions;

Glass-ceramic specimens having type 2 as the surface layer on type 1 (compressive surface ceramic);

Glass-ceramic specimens of type 1 and 2 individually with alloy additions (toughened ceramic); and Glass-ceramic specimens having type 2 with alloy as the surface layer on type 1 (toughened and compressive surface ceramic).

Type 1 and type 2 glass-ceramics are described in the aforementioned U.S. Pat. No. 4,301,324, and are characterized by the following composition ranges:

| Type 1 | | Type 2 | |
| --- | --- | --- | --- |
| | Range wt. % Composition | | Range wt. % Composition |
| $SiO_2$ | 54.0–56.1 | $SiO_2$ | 54.0–56.1 |
| MgO | 21.5–22.5 | MgO | 19.5–20.5 |
| $Al_2O_3$ | 20.5–21.5 | $Al_2O_3$ | 20.5–21.5 |
| $P_2O_5$ | 0.1–0.5 | $P_2O_5$ | 2.5–3.5 |
| $B_2O_3$ | 1.0–1.5 | $B_2O_3$ | 1.0–1.5 |

The mechanical properties of the sintered specimens of the above kind are noted in the following table:

controlling toughness improvement. The somewhat lowered strengths of the toughened glass ceramics relative to the reference untoughened glass ceramics, as noted in the table, are believed attributable to the decrease in the density of the ceramic and possibly to poor bonding between the alloy surface and the ceramic matrix. By having compressive surface ceramics and the addition of alloy particles, both high strength and increased toughness are achieved as noted in the table.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A cordierite glass-ceramic substrate comprising a glass ceramic material and an alloy selected from a group of alloys consisting of:

| | |
| --- | --- |
| Fe—Cr | Cu—Ti |
| Fe—Cr—Ni | Ag—Ti |
| Cr—Al | Nb—Al |
| Ni—Cr | Cu—Al |
| Ni—Al | Cu—Al—Cr |
| Fe—Al | | said selected alloy being in the range from about 2 to about 20 volume percent and dispersed within said cordierite glass ceramic material.

2. A sintering process comprising preparing a cordierite glass-ceramic slurry containing an alloy powder or flakes selected from a group of alloys consisting of:

| GLASS CERAMIC SPECIMEN | Wt % Alloy Composition | Alloy V/O | Alloy Av Part Size (μ) | Strength (Kpsi) | % Toughness Improvement |
| --- | --- | --- | --- | --- | --- |
| Type 1 | — | — | — | 36.8 ± 3.3 | Reference |
| Type 2 | — | — | — | 33.0 ± 2.5 | Reference |
| Type 2 surface on Type 1 bulk (compressive surface) | — | — | — | 43.4 ± 1.7 | 15–20 |
| Thickness Ratio: Type: 2 1 2 No. of layers: 2 16 2 | | | | | |
| Type 1 with alloy | 80.0 Ni 20.0 Cr | 5 | 15 | 27.0 ± 2.0 | 15–20 |
| | 80.0 Ni 20.0 Cr | 10 | 15 | 24.0 ± 2.5 | 20–25 |
| Type 1 with alloy | 93.5 Cu 6.5 Al | 10 | 15 | 27.3 ± 1.3 | 30–40 |
| | 95.5 Cu 4.5 Al | 10 | 8 | 32.6 ± 3.0 | 50–55 |
| Type 2 with alloy | 96.0 Cu 4.0 Al | 9 | 8 | 29.3 ± 1.4 | 40–45 |
| | 99.4 Cu 0.4 Al 0.2 Cr | 9 | 6 | 29.1 ± 1.9 | 45–50 |
| Type 2 + alloy surface on Type 1 Bulk (compressive surface) | 96.0 Cu 4 Al | 9 | 8 | 41.4 ± 2.3 | 55–60 |
| | 99.4 Cu 0.4 Al | 9 | 6 | 43.7 ± 3.1 | 55–60 |
| Thickness Ratio: Type: 2 + A 1 2 + A No. of layers: 2 16 2 (where A = alloy) | 0.2 Cr | | | | |

It was determined from the work undertaken in connection with the table that homogeneity, particle size, alloy composition and interfacial bonding between metal alloy and glass-ceramic are critical parameters in

| | |
|---|---|
| Fe—Cr | Cu—Ti |
| Fe—Cr—Ni | Ag—Ti |
| Cr—Al | Nb—Al |
| Ni—Cr | Cu—Al |
| Ni—Al | Cu—Al—Cr |
| Fe—Al | | and sintering said slurry in an oxidizing atmosphere up to about 800° C. followed by sintering in an inert or reducing atmosphere up to about 1000° C., said selected alloy powder or flakes having a volume percent, relative to the volume of said slurry after sintering, in the range from about 2 to about 20 percent.

3. The sintering process defined in claim 2 wherein said oxidizing atmosphere is steam.

4. The sintering process defined in claim 2 wherein said selected alloy powder or flakes is Cu-Al and said volume percent thereof about 9-10%.

5. The sintering process defined in claim 2 wherein said selected alloy powder or flakes is Cu-Al-Cr and said volume percent thereof is about 9%.

6. The sintering process defined in claim 5 wherein the average particle size of said selected alloy powder or flakes is about 8-15μ.

7. The sintering process defined in claim 6 wherein the average particle size of said selected alloy powder or flakes is about 6μ.

* * * * *